(12) United States Patent
Sarkar et al.

(10) Patent No.: US 9,990,233 B2
(45) Date of Patent: Jun. 5, 2018

(54) BINARY TRANSLATION FOR MULTI-PROCESSOR AND MULTI-CORE PLATFORMS

(71) Applicant: Intel Corporation, Santa Clara, CA (US)

(72) Inventors: Abhik Sarkar, Foster City, CA (US); Jiwei Lu, Pleasanton, CA (US); Palanivelrajan Rajan Shanmugavelayutham, San Jose, CA (US); Jason M. Agron, San Jose, CA (US); Koichi Yamada, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 252 days.

(21) Appl. No.: 14/129,420

(22) PCT Filed: Jun. 28, 2013

(86) PCT No.: PCT/US2013/048563
§ 371 (c)(1),
(2) Date: Mar. 8, 2016

(87) PCT Pub. No.: WO2014/209361
PCT Pub. Date: Dec. 31, 2014

(65) Prior Publication Data
US 2016/0188372 A1    Jun. 30, 2016

(51) Int. Cl.
*G06F 9/445* (2006.01)
*G06F 9/455* (2006.01)
(Continued)

(52) U.S. Cl.
CPC ............. *G06F 9/5038* (2013.01); *G06F 8/61* (2013.01); *G06F 8/62* (2013.01); *G06F 9/45516* (2013.01);
(Continued)

(58) Field of Classification Search
None
See application file for complete search history.

(56) References Cited

U.S. PATENT DOCUMENTS 8,087,018 B2 * 12/2011 Yoav ..................... G06F 9/545
712/242
8,812,873 B2 * 8/2014 Goffman ............... G06F 21/125
713/190

(Continued)

FOREIGN PATENT DOCUMENTS

| CN | 1570870 A | 1/2005 |
| CN | 102087609 A | 6/2011 |
| WO | 2005022388 A1 | 3/2005 |

OTHER PUBLICATIONS

International Search Report and Written Opinion received for International Application No. PCT/US2013/048563, dated Mar. 31, 2014, 10 pages.

(Continued)

*Primary Examiner* — Emerson C Puente
*Assistant Examiner* — Jonathan R Labud
(74) *Attorney, Agent, or Firm* — Barnes & Thornburg LLP

(57) ABSTRACT

Technologies for partial binary translation on multi-core platforms include a shared translation cache, a binary translation thread scheduler, a global installation thread, and a local translation thread and analysis thread for each processor core. On detection of a hotspot, the thread scheduler first resumes the global thread if suspended, next activates the global thread if a translation cache operation is pending, and (Continued)

last schedules local translation or analysis threads for execution. Translation cache operations are centralized in the global thread and decoupled from analysis and translation. The thread scheduler may execute in a non-preemptive nucleus, and the translation and analysis threads may execute in a preemptive runtime. The global thread may be primarily preemptive with a small non-preemptive nucleus to commit updates to the shared translation cache. The global thread may migrate to any of the processor cores. Forward progress is guaranteed. Other embodiments are described and claimed.

34 Claims, 4 Drawing Sheets

(51) Int. Cl.
G06F 9/48 (2006.01)
G06F 9/50 (2006.01)
G06F 12/02 (2006.01)
G06F 12/0802 (2016.01)

(52) U.S. Cl.
CPC ............ *G06F 9/485* (2013.01); *G06F 9/5016* (2013.01); *G06F 12/0253* (2013.01); *G06F 12/0802* (2013.01); *G06F 2212/1044* (2013.01); *G06F 2212/60* (2013.01)

(56) References Cited

U.S. PATENT DOCUMENTS

2004/0181785 A1 9/2004 Zwirner et al.
2005/0050389 A1 3/2005 Chaurasia
2007/0067573 A1 3/2007 Bruening et al.
2009/0222654 A1 9/2009 Hum et al.

OTHER PUBLICATIONS

Chinese Office Action for Patent Application No. 201380076992.X, dated Dec. 21, 2017, 5 pages.

* cited by examiner

BINARY TRANSLATION FOR MULTI-PROCESSOR AND MULTI-CORE PLATFORMS

CROSS REFERENCE TO RELATED APPLICATIONS

This application is a national stage entry under 35 USC § 371(b) of International Application No. PCT/US2013/048563, which was filed Jun. 28, 2013.

BACKGROUND

Computer processors typically execute binary code encoded in a particular instruction set. Binary translation translates binary code targeted for a particular instruction set into translated binary code, generally targeted for another instruction set. Binary translation may be used to enable backward- or forward-compatibility for software applications, or to improve processing efficiency. For example, binary code targeted for a reduced instruction set computing (RISC) architecture such as PowerPC may be translated into binary code targeting a complex instruction set computing (CISC) architecture such as IA-32, allowing legacy applications to run on newer hardware. As another example, binary translation may generate translated binary code targeting the same computer architecture but optimized by using newer features such as wider instructions, improved vector instructions, or the like. Binary translation may be dynamic, that is, the code may be translated as it is executed. For some systems, binary translation software may execute close to the hardware, transparent to any operating system or virtual machine monitor (VMM).

Some binary translation systems provide partial translation. In such systems, the processor may execute binary code natively until a code "hotspot" is detected. The hotspot may be any segment of code that may benefit from optimization through binary translation. Upon detecting the hotspot, the system analyzes the native code, translates the native code to translated code, and installs the translated code in a translation cache (a "T-cache"). After translation, the processor executes the translated code instead of native code whenever the hotspot is encountered. Binary translation systems also may account for self-modifying code; that is, executable code that modifies itself at runtime. Translated code regions that are affected by self-modifying code are typically invalidated.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
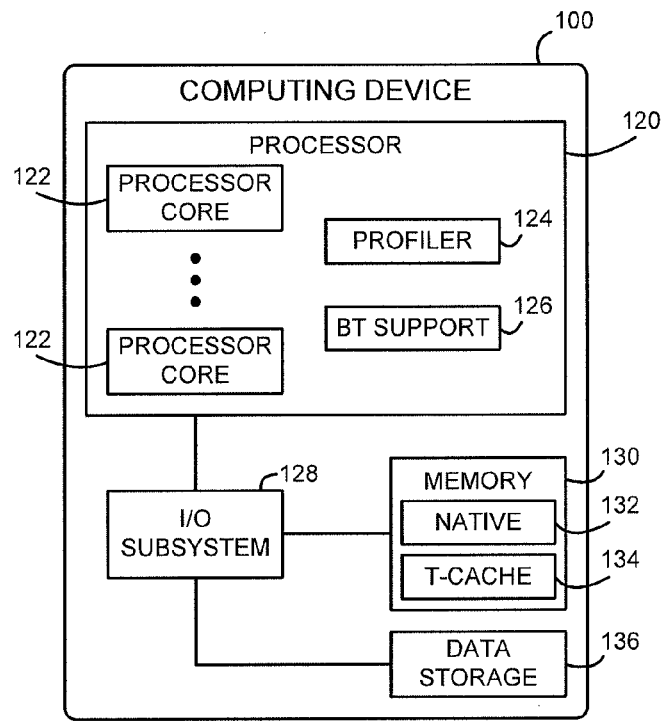
FIG. 1 is a simplified block diagram of at least one embodiment of a computing device for binary translation in a multi-core or multi-processor platform.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative computing device 100 for binary translation includes a multi-core processor 120, an I/O subsystem 128, and a memory 130. The processor 120 supports hotspot-driven partial binary translation; that is, each core of the processor 120 may execute code natively or may generate and execute optimized translated code. The memory 130 includes a global translation cache shared between all cores of the processor 120. All update operations on the global translation cache are centralized within a single global thread; installation is thus isolated from translation and analysis. The update operations use short non-preemptive commit phases and non-blocking locks to enable forward progress of the binary translation system at all times. Additionally, the global thread may be migrated between processor cores to allow proactive completion of critical tasks performing translation cache updates. The binary translation system scheduler prioritizes binary translation tasks in the following order, with the highest-priority tasks first: local translation un-installation, global thread resumption, global thread activation to install or delete translations, local thread scheduling (with translation prioritized over analysis), and, lastly, local installation of translations.

Sharing the translation cache among cores, as opposed to generating one private translation cache per core, reduces resource consumption and prevents duplicative binary translation. Additionally, the computing device 100 coordinates binary translation activities among the cores to avoid deadlocks and guarantee forward progress of the binary translation. Thus, the binary translation supported by the computing device 100 is practical for processors 120 including large numbers of processor cores.

The computing device 100 may be embodied as any type of computing device capable of performing the functions described herein. For example, the computing device 100 may be embodied as, without limitation, a computer, a smart phone, a tablet computer, a laptop computer, a notebook computer, a desktop computer, a workstation, a mobile computing device, a cellular telephone, a handset, a messaging device, a vehicle telematics device, a network appliance, a web appliance, a distributed computing system, a multiprocessor system, a processor-based system, a consumer electronic device, a digital television device, and/or any other computing device configured to handle system management interrupts. As shown in FIG. 1, the illustrative computing device 100 includes the processor 120, the I/O subsystem 128, the memory 130, and a data storage device 136. Of course, the computing device 100 may include other or additional components, such as those commonly found in a desktop computer (e.g., various input/output devices), in other embodiments. Additionally, in some embodiments, one or more of the illustrative components may be incorporated in, or otherwise from a portion of, another component. For example, the memory 130, or portions thereof, may be incorporated in the processor 120 in some embodiments.

The processor 120 may be embodied as any type of multi-core processor capable of performing the functions described herein. For example, the processor 120 may be embodied as a microprocessor, digital signal processor, microcontroller, or other processor or processing/controlling circuit. The processor 120 includes processor cores 122; each of the processor cores 122 is an independent processing unit capable of executing programmed instructions. The illustrative processor 120 includes two processor cores 122; however the processor 120 may include one or more processor cores 122 in other embodiments. Although illustrated as included a single processor 120 including multiple processor cores 122, in other embodiments the computing device 100 may include multiple processors 120, each of which may be single- or multi-core.

The processor 120 includes a profiler 124. The profiler 124 profiles execution of native code by the processor cores 122 and detects hotspots. As described above, a hotspot is a segment of native code that may be suitable for optimization through binary translation. Upon detection of a hotspot, the profiler 124 generates an interrupt, commonly known as a hotspot event (HSE), for a particular processor core 122. The profiler 124 may be implemented in hardware, microcode, or firmware.

The processor 120 further includes a binary translation support module 126. The binary translation support module 126 intercepts hotspot events generated by the profiler 124 and switches execution to appropriate binary translation software on the affected processor core 122. The binary translation support module 126 also detects self-modifying code within the translated code and flags the self-modifying code within the translated code for deletion. The binary translation support module 126 also may include a translation entry mechanism to allow the processor cores 122 to execute translated code. In some embodiments, the translation entry mechanism may include a mapping table to map virtual addresses to translated code. For example, the binary translation support module 126 may set an entry in a page table for each processor core 122 that refers to the translated code in a translation context. The binary translation support module 126 may be implemented in hardware, microcode, or firmware.

The processor 120 is communicatively coupled to the I/O subsystem 128, which may be embodied as circuitry and/or components to facilitate input/output operations with the processor 120, the memory 130, and other components of the computing device 100. For example, the I/O subsystem 128 may be embodied as, or otherwise include, memory controller hubs, platform controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 128 may form a portion of a system-on-a-chip (SoC) and be incorporated, along with the processor 120, the memory 130, and other components of the computing device 100, on a single integrated circuit chip.

The memory 130 may be embodied as any type of volatile or non-volatile memory or data storage capable of performing the functions described herein. In operation, the memory 130 may store various data and software used during operation of the computing device 100 such as operating systems, applications, programs, libraries, and drivers. As described above, the memory 130 may be communicatively coupled to the processor 120 via the I/O subsystem 128, or in some embodiments may be directly coupled to the processor 120. The memory 130 includes a native code region 132 and a translation cache 134. As described above, each processor core 122 executes code stored in the native code region 132. Additionally, each processor core 122 may translate code stored in the native code region 132 and store the translated code in the translation cache 134. As described above, the translation cache 134 is shared among all of the processor cores 122. In some embodiments the translation cache 134 may be inaccessible or otherwise protected from an operating system or VMM of the computing device 100. The memory 130 may further include concurrently control mechanisms for the translation cache 134, including a non-blocking multiple-reader/single-writer lock. In other embodiments (not illustrated), the memory 130 may include more than one hybrid shared/private translation cache 134, and each of those hybrid translation caches 134 may be shared among a domain including a disjoint subset of the processor cores 122. In other words, the memory 130 may include one translation cache 134 for each domain, where each domain caters to sharing resources among a subset of the processor cores 122.

The data storage 136 may be embodied as any type of device or devices configured for short-term or long-term storage of data such as, for example, memory devices and circuits, memory cards, hard disk drives, solid-state drives, or other data storage devices. The data storage 136 may store software and/or firmware for binary translation, as well as native code images.

Figure 2:
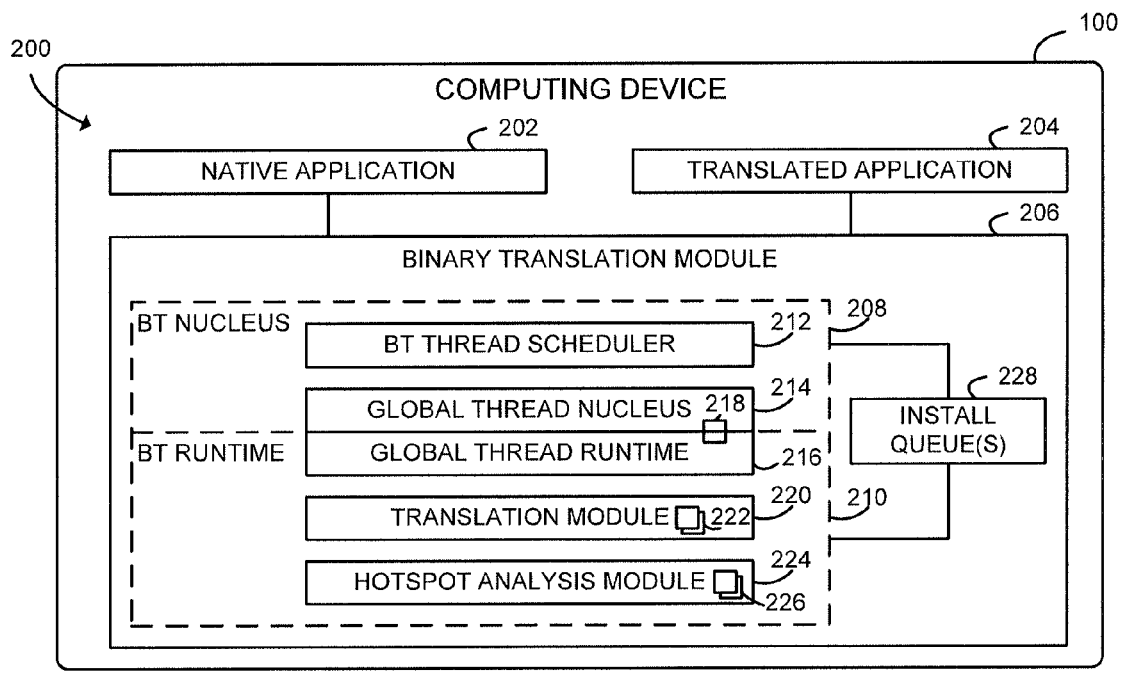
FIG. 2 is a simplified block diagram of at least one embodiment of an environment of the computing device of FIG. 1.

Referring now to FIG. 2, in one embodiment, the computing device 100 establishes an environment 200 during operation. The illustrative embodiment 200 includes a native application 202, a translated application 204, and a binary translation module 206. The various modules of the environment 200 may be embodied as hardware, firmware, software, or a combination thereof.

The native application 202 may be embodied as any native executable located in the native code region 132. The translated application 204 may be embodied as translated binary code corresponding to the native application 202. Thus, the native application 202 is the input and the translated application 204 is the output of binary translation. Although illustrated as applications, both the native application 202 and the translated application 204 may include any executable code or fragment of executable code, such as operating systems, utility programs, code libraries, or other executable code.

The binary translation module 206 is configured to translate native binary code of the native application 202 into translated binary code of the translated application 204. To perform binary translation, the binary translation module 206 performs three phases: analysis, translation, and installation. In the analysis phase, the binary translation module 206 identifies a region in the native code region 132 identified by the profiler 124—the "hotspot"—for translation. In the translation phase, native code at the hotspot is translated and queued for installation. In the installation phase, the translated code is installed into the translation cache 134, allowing the computing device 100 to execute the translated application 204. In some embodiments, each of those phases may be executed by sub-modules, for example by a binary translation thread scheduler 212, a global thread nucleus 214, a global thread runtime 216, a translation module 220, a hotspot analysis module 224, or an install queue 228.

The binary translation module 206 further contains a binary translation nucleus 208 and a binary translation runtime 210. Functions of the binary translation nucleus execute in a non-preemptive state on the processor core 122; that is, functions of the binary translation nucleus 208 may not be interrupted by other processes of the computing device 100 or by external interrupts. Thus, to achieve acceptable latency and preserve interactivity, operations within the binary translation nucleus 208 may be non-blocking and may have relatively short execution times. The binary translation thread scheduler 212 and the global thread nucleus 214 may be contained within the binary translation nucleus 208. In contrast, functions of the binary translation runtime 210 execute in a preemptive state on the processor core 122; that is, functions of the binary translation runtime 210 may be interrupted by other processes of the computing device 100 or by external interrupts. When interrupted, functions of the binary translation runtime 210 may be suspended and capable of being resumed at a later time. The global thread runtime 216, the translation module 220, and the hotspot analysis module 224 may be contained within the binary translation runtime 210.

The various phases of the binary translation module 206 may be performed by one or more threads managed by the binary translation thread scheduler 212. The installation phase may be performed by a single global thread 218. The global thread 218 is migratable between processor cores 122 and may execute in both preemptive and non-preemptive modes, and is therefore illustrated as contained within both the binary translation nucleus 208 and the binary translation runtime 210. Although illustrated as including a single global thread 218, in some embodiments where the processor cores 122 are divided into subsets included in domains, the binary translation module 206 may include one global thread 218 for each domain. The translation phase may be performed by one or more translation threads 222 contained within the binary translation runtime 210. Each of the translation threads 222 may execute on only a single processor core 122, and the binary translation module 206 may include one translation thread 222 for each processor core 122. Similarly, the analysis phase may be performed by one or more analysis threads 226 contained within the binary translation runtime 210. Each of the analysis threads 226 may execute on only a single processor core 122, and the binary translation module 206 may include one analysis thread 226 for each processor core 122. Each of the threads 218, 222, 226 may be embodied as a hardware thread, an operating system thread, a lightweight process, a fiber, or any other independent stream of instructions capable of execution on one of the processor cores 122.

The install queue(s) 228 buffer translation data produced by the translation threads 222 that is to be installed in the translation cache 134. Thus, the install queue(s) 228 decouples translation, which may be performed simultaneously on multiple threads 222, 226, from installation, which is performed serially by a single global thread 218. Accordingly, the install queue(s) 228 may be accessed by both the binary translation nucleus 208 and the binary translation runtime 210. The install queue(s) 228 may include a separate install queue for each of the processor cores 122. In some embodiments, the install queue(s) 228 may include a single install queue shared among all of the processor cores 122 that includes a concurrency control mechanism.

Figure 3:
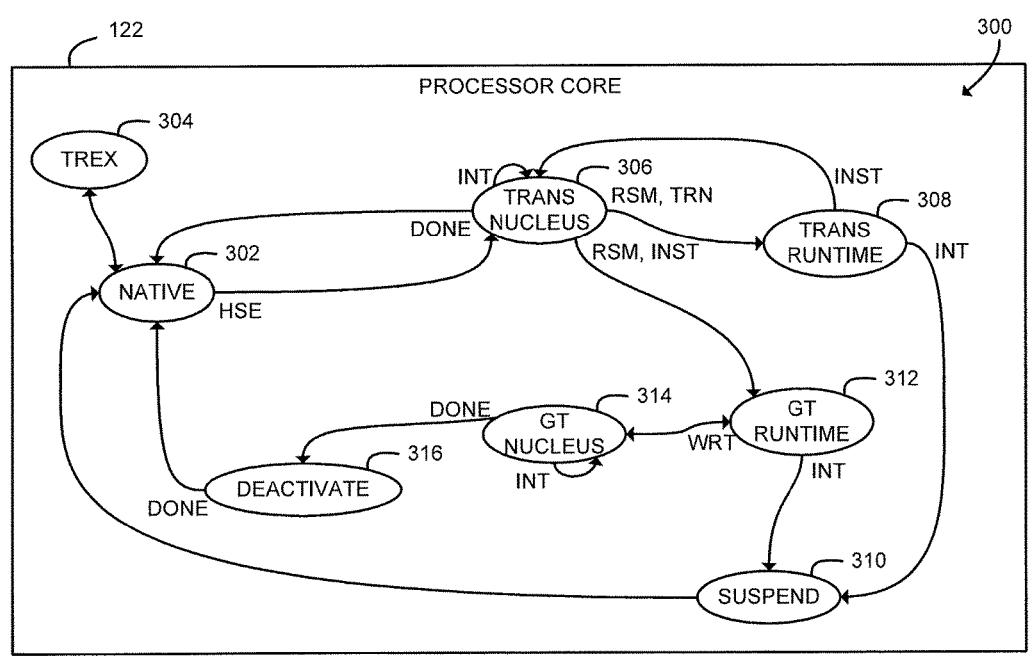
FIG. 3 is a simplified state transition diagram of at least one embodiment of a processor core of the computing device of FIGS. 1 and 2.

Referring now to FIG. 3, in use, each processor core 122 of the computing device 100 may execute in a number of states illustrated by the state transition diagram 300. The processor core 122 begins in the NATIVE state 302. In the NATIVE state 302, the processor core 122 executes code natively; that is, the processor core 122 executes code from the native code region 132 without applying any binary translation. The processor core 122 may transition back and forth from the NATIVE state 302 to the TREX state 304. In the TREX state 304, the processor core 122 executes translated code from the translation cache 134. While in the NATIVE state 302, when a hotspot event (HSE) is detected, the processor core 122 transitions to the TRANS nucleus state 306.

The TRANS nucleus state 306 is a non-preemptive state. That is, the processor core 122 may not be interrupted; as illustrated by the INT state transition leading back to the TRANS nucleus state 306. In the TRANS nucleus state 306, the processor core 122 executes the binary translation thread scheduler. As described below, the binary translation thread scheduler manages the execution of and establishes priorities between analysis, translation, and installation threads. Each of these threads may be preempted at various points, and the thread scheduler must identify which task to start or resume. Upon determining to start the analysis or translation thread, or to resume a suspended analysis or translation thread, the processor core 122 transitions to the TRANS runtime state 308.

The TRANS runtime state 308 is a preemptive state. That is, upon receiving an interrupt INT, the processor core 122 transitions to the SUSPEND state 310. In the SUSPEND state 310, the currently executing thread is suspended, to be capable of being resumed at a later time. For example, the processor core 122 may store the current thread context, a copy of the current architectural state, or the like. After suspending, the processor core 122 transitions back to the NATIVE state 302. Thus, a suspended thread may only be resumed upon later detection of an HSE event.

Referring back to the TRANS runtime state 308, after completing hotspot analysis and translation, the processor core 122 transitions back to the TRANS nucleus state 306 to initiate installation of the translated code. In the TRANS nucleus state 306, the processor core 122 determines whether to start or resume a global thread to handle the installation task. To perform the installation, the processor core 122 transitions to the global thread runtime state 312.

The global thread runtime state 312 is a preemptive state. Upon receiving an interrupt INT, the processor core 122 transitions to the SUSPEND state 310, and the global thread is suspended as described above. While in the global thread runtime state 312, the processor core 122 installs translated code into the global translation cache 134. When writing to the global translation cache 134, the processor core 122 transitions to the global thread nucleus state 314.

The global thread nucleus state 314 is a non-preemptive state. That is, any interrupt INT does not cause the processor core 122 to transition states. Thus, writes to the translation cache 134 are atomic and may be protected using a comparatively simple and error-free non-blocking multiple-reader/single-writer lock. To reduce input latencies, all writes should be committed relatively quickly so that the processor core 122 may transition out of the global thread nucleus state 314 quickly. After completing the writes, if further installation tasks remain the processor core 122 transitions to the global thread runtime state 312. If no further installation tasks remain, the processor core 122 transitions to the DEACTIVATE state 316. In the DEACTIVATE state 316, the global thread is deactivated. Unlike in the SUSPEND state 310, when deactivated the global thread may not be resumed and instead must be restarted when needed. After deactivating the global thread, the processor core 122 transitions back to the NATIVE state 302.

Figure 4:
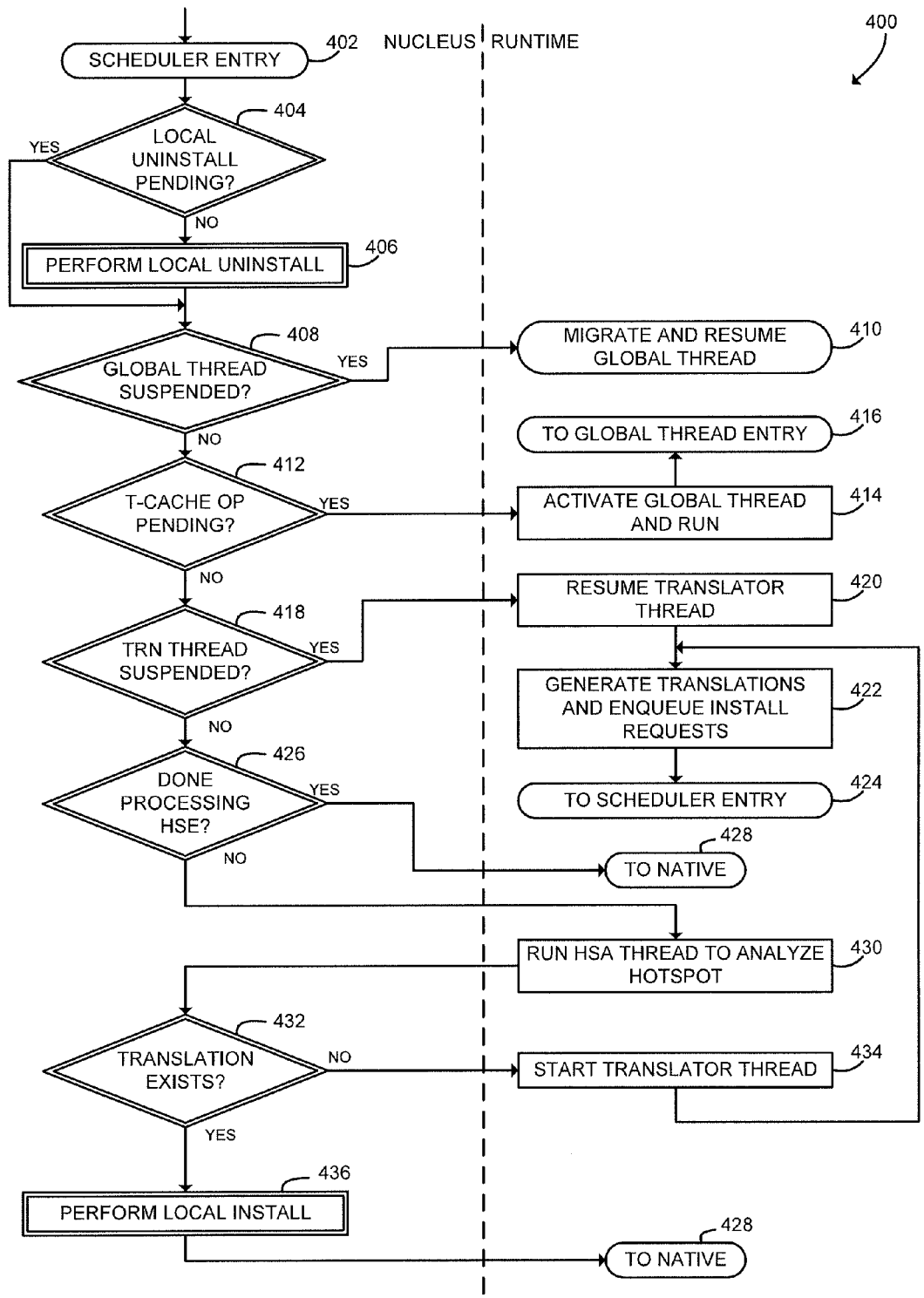
FIG. 4 is a simplified flow diagram of at least one embodiment of a method for binary translation thread scheduling that may be executed by the computing device of FIGS. 1 and 2.

Referring now to FIG. 4, in use, the computing device 100 may execute a method 400 for binary translation thread scheduling. The method begins with scheduler entry in block 402. As described above, the binary translation thread scheduler may be entered after detection of a hotspot event (HSE) generated by the profiler 124. As illustrated, the thread scheduler is entered in the binary translation nucleus 208. As described above, while in the binary translation nucleus 208 the method 400 is non-preemptive. Non-preemptive processes of the method 400 are illustrated in FIG. 4 with double-lined blocks; preemptive processes are illustrated with single-lined blocks.

After thread entry, in block 404 the computing device 100 determines whether a local uninstall is pending for the current processor core 122. A local uninstall is pending when a portion of translated code has been marked for deletion by the global thread 218. To determine whether a local uninstall is pending, the computing device 100 may check a deletion pending event flag or other data structure specific to the current processor core 122. The computing device 100 checks for local uninstalls prior to resuming or starting binary translation threads to ensure consistency between the current processor core 122 and the translation cache 134. If a local uninstall is not pending, the method 400 branches ahead to block 408. If a local uninstall is pending, the method 400 advances to block 406.

In block 406, the computing device 100 performs any pending local uninstalls for the current processor core 122. The computing device 100 may invoke the binary translation support module 126 to remove translated code segments that are scheduled for local uninstall from data structures specific to the current processor core 122. For example, the computing device 100 may remove references to the virtual address of the translated code segments from a page table of the current processor core 122.

In block 408, the computing device 100 determines whether the global thread 218 is suspended. As described above, the global thread 218 may be preempted and suspended during execution. If the global thread 218 is not suspended, the method 400 branches ahead to block 412. If the global thread 218 is suspended, the method 400 advances to block 410. In block 410, the computing device 100 migrates the global thread 218 to the current processor core 122 and resumes the global thread 218. Thread migration may be enabled using microcode or other low-level features of the processor core 122. In doing so, the computing device 100 transitions to the binary translation runtime 210, allowing preemption. After resuming the global thread 218, the method 400 transfers execution to the point where the global thread 218 was previously suspended, as described below with respect to FIG. 5. Thus, the computing device 100 prioritizes the global thread 218 over other binary translation threads 222, 226 by resuming the global thread 218 prior to starting or resuming any other binary translation threads 222, 226.

Referring back to block 408, if the global thread 218 is not suspended, the method 400 branches ahead to block 412. In block 412, the computing device 100 determines whether a translation cache operation is pending. A translation cache operation may include a requested installation or a requested deletion from the translation cache 134. As described below, after completing translation, the translation thread enqueues translated code for installation by the global thread 218 in the install queue(s) 228. Additionally, the binary translation support module 126 may mark translated code for deletion as a result of detecting self-modified code. If no translation cache operation is pending, the method 400 branches ahead to block 418. If a translation cache operation is pending, the method 400 advances to block 414. In block 414, the computing device 100 activates the global thread 218 on the current processor core 122. As described above, the global thread 218 is activated in the binary translation runtime 210, allowing preemption. After activation, the method 400 advances to the global thread entry point in block 416, as described below with respect to FIG. 5.

Referring back to block 412, if no translation cache operation is pending, the method 400 branches ahead to block 418. In block 418, the computing device 100 determines whether a translation thread 222 associated with the current processor core 122 is suspended. Unlike the global thread 218, several translation threads 222 may exist contemporaneously on the computing device 100. Thus, the translation threads 222 are not migrated between the processor cores 122. If no translation thread 222 for the processor core 122 is suspended, the method 400 branches ahead to block 426. If a translation thread 222 has been suspended, the method 400 advances to block 420.

In block 420, the computing device 100 resumes the translation thread 222. The translation thread 222 is resumed and executes in the binary translation runtime 210 and is therefore preemptible. Thus, the computing device 100 prioritizes translation over analysis by resuming a translation thread 222 prior to starting an analysis thread 226. In block 422, the computing device 100, executing the translation thread 222, generates translated code for the hotspot. Translated code is enqueued in the install queue 228 to be installed by the global thread 218. As described above, each processor core 122 may have a dedicated install queue 228, or a single install queue 228 may be shared by the processor cores 122, subject to a concurrency control mechanism such as locking. After enqueuing the translated code, the method 400 jumps back to the scheduler entry in block 424. Accordingly, the computing device 100 re-enters the binary translation scheduler at block 402, as described above.

Referring back to block 418, if no translation thread 222 for the processor core 122 is suspended, the method 400 branches ahead to block 426. In block 426, the computing device 100 determines whether the currently detected hotspot event (HSE) has been completely handled. That is, the computing device 100 determines whether the translation thread 222 has completed generating translated code for the currently detected HSE (as opposed to, for example, an earlier HSE for which translation was preempted). If code generation has been completed, the computing device 100 exits the binary thread scheduler and returns to native code execution in block 428. As described above, during native code execution, the computing device 100 may execute translated code from the translation cache 134 as it is encountered. If code generation has not been completed, the method 400 branches to block 430.

In block 430, the computing device 100 starts an analysis thread 226 to analyze the current hotspot event. The analysis thread 226 executes in the binary translation runtime 210 and is therefore preemptible. As illustrated, the analysis thread 226 has the lowest priority of the other threads and will only execute when there is no suspended global thread 218, no pending translation cache operation, and no suspended translation thread 222. During execution of the analysis thread 226, the computing device 100 identifies a target location within the native code region 132 corresponding to the native code to be translated. The identified hotspot may be a frequently-executed code region, a loop, a nested loop, a basic block, or any other code region that may benefit from binary translation. After completion of the analysis thread 226, the method 400 advances to block 432.

In block 432, the computing device 100 determines whether translated code exists in the translation cache 134 for the hotspot identified by the analysis thread 226. Block 432 executes in the binary translation nucleus 208 and is thus non-preemptible. If no translation exists, the method 400 advances to block 434. In block 434, the computing device 100 starts a translation thread 222 to translate the hotspot. The translation thread 222 executes in the binary translation runtime 210 and is therefore preemptible. After starting the translation thread 222, the method 400 proceeds to block 422 to generate translations and enqueue translated code for installation, as described above.

Referring back to block 432, if a translation does exist for the hotspot, the method 400 branches ahead to block 436. In block 436, the computing device 100 performs a local install of the translated code for the current processor core 122. Local installation makes the translated code visible and executable for the current processor core 122. During local installation, the computing device 100 may program a translation entry mechanism of the current processor core 122. For example, the computing device 100 may use the binary translation support module 126 to install references to the translated code in a page table for the processor core 122 for a translation context. The local installation is performed in the binary translation nucleus 208 and is therefore non-preemptible. Additionally, during local installation, the computing device 100 may take out a non-blocking multiple-reader/single-writer lock on the translation cache 134 to ensure the translation cache 134 is not updated by the global thread 218 during the local installation and thus ensure data consistency. In one embodiment, such a non-blocking lock may be implemented by determining whether the lock is taken by a writer and yielding execution if the lock is taken by another thread as a writer. Thus, forward progress of binary translation is guaranteed. After performing the local install, the method 400 advances to block 428 to return to native code execution, as described above.

In summary, the method 400 may be invoked on each of the processor cores 122 upon encountering a hotspot event. Each invocation of the method 400 prioritizes scheduling the global thread 218 over any local translation thread 222 or analysis thread 226. Thus, the method 400 effectively implements a single global scheduler that prioritizes the global thread 218, along with one or more local schedulers that schedule the threads 222, 226 on the local processor core 122. Accordingly, the global thread 218 is decoupled from the execution of the translation threads 222 and the analysis threads 226.

Figure 5:
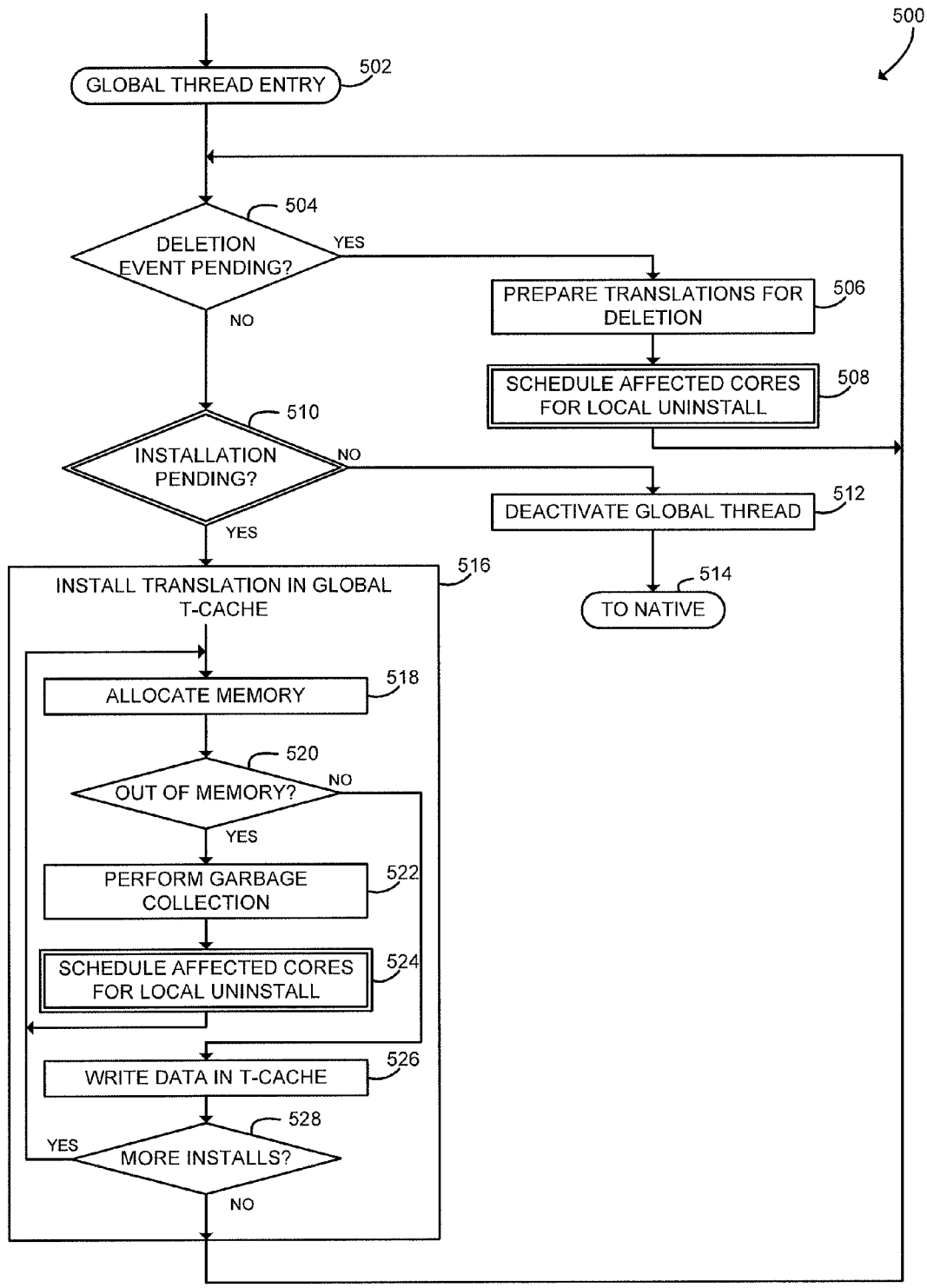
FIG. 5 is a simplified flow diagram of at least one embodiment of a method for a global thread that may be executed by the computing device of FIGS. 1 and 2.

Referring now to FIG. 5, in use, the computing device 100 may execute a method 500 for the global thread 218. The method 500 begins at the global thread entry point in block 502 and advances to block 504. In block 504, the computing device 100 determines whether a deletion event is pending for the translation cache 134. Non-preemptive processes of the method 500 are illustrated in FIG. 5 with double-lined blocks; preemptive processes are illustrated with single-lined blocks. Thus, the determination of block 504 is made in the binary translation runtime 210, meaning this determination is preemptible. The deletion event indicates that translated code within the translation cache 134 should be deleted, for example when the translated code is no longer valid. A deletion event may be generated by the binary translation support module 126 upon detection of self-modifying code. The computing device 100 may determine whether a deletion event pending flag has been set by the binary translation support module 126. If no deletion event is pending, the method 500 branches ahead to block 510. If a deletion event is pending, the method 500 advances to block 506.

In block 506, the computing device 100 prepares affected translations for deletion from the translation cache 134. To prepare for deletion, the computing device 100 determines all affected memory locations to update. However, the computing device 100 does not commit any writes to memory. The preparations are made in the binary translation runtime 210 and are therefore preemptible.

In block 508, the computing device 100 deletes the affected code from the translation cache 134 and schedules any affected processor cores 122 for local uninstall. The deletions to the translation cache 134 are written in the binary translation nucleus 208 and are therefore non-preemptible. Because only a single global thread 218 may be active at any time, there will be no concurrent installations to the translation cache 134. Thus, the global thread 218 may acquire a non-blocking multiple readers/single writer lock before writing to the translation cache 134. Thus, the updates to the translation cache 134 are effectively atomic with respect to each other, and the translation cache 134 may always be in a consistent state. The computing device 100 may schedule local uninstalls by setting deletion pending event flags or otherwise updated a data structure specific to the affected processor cores 122. Scheduling the local uninstalls in the binary translation nucleus 208 assures that deleted translations will no longer be visible to the affected processor cores 122, as described above.

Referring back to block 504, if no deletion event is pending, the method 500 branches ahead to block 510. In block 510, the computing device 100 determines whether a translation installation is pending. The computing device 100 may reference the install queue 228 for any pending translations enqueued by the translation threads 222. The global thread 218 may implement job scheduling logic to select the translated code for installation to prioritize certain translations, assure fairness, or otherwise control the order of installation. This determination occurs in the binary translation nucleus 208 and is thus non-preemptible. If no installation is pending, the method 500 advances to block 512. In block 512, the computing device 100 deactivates the global thread 218, and in block 514 the computing device 100 returns to native code execution. The computing device 100 leaves the binary translation nucleus 208 and is therefore preemptible. As described above, once in native code execution, the computing device 100 may execute native code and any translated code within the translation cache 134 that is encountered. Further, as described above, once deactivated, the global thread 218 may be restarted by the binary thread scheduler when needed.

Referring back to block 510, if an installation is pending, the method 500 branches ahead to block 516. Block 516 executes in the binary translation runtime 210 and is therefore preemptible, unless otherwise indicated. In block 516, the computing device 100 installs the translated code generated by the translation thread 222 into the global translation cache 134. In block 518, the computing device 100 allocates memory within the translation cache 134 for the translated code. In block 520, the computing device 100 determines whether sufficient memory was allocated. If so, the method 500 branches ahead to block 526, described below. If not, the method 500 advances to block 522.

In block 522, the computing device 100 performs garbage collection to reclaim memory within the translation cache 134. The computing device 100 may employ any algorithm to identify translated code within the translation cache 134 that may be deleted. For example, the computing device 100 may delete translated code that has not been used recently. As another example, the computing device 100 may delete translated code that is not reachable from other translated code. During garbage collection, the computing device 100 identifies translated code for deletion but does not commit any updates to memory.

In block 524, the computing device 100 deletes the reclaimed memory from the translation cache 134 and sets local uninstalls for any affected processor cores 122. The updates to the translation cache 134 and setting the local uninstalls occur within the binary translation nucleus 208 and are therefore non-preemptible. As described above, during the updates, the global thread 218 may take out a non-blocking multiple-readers/single-writer lock on the translation cache 134 to assure data consistency. The local uninstalls are set by updating a deletion pending event flag or other data structure specific to the affected processor cores 122 as described above in connection with block 508. After scheduling the local uninstalls, the method 500 loops back to block 518 to again attempt to allocate memory.

Referring back to block 520, if sufficient memory was allocated, the method 500 branches ahead to block 526. In block 526, the computing device 100 writes the translated data into the translation cache 134. The global thread 218 may protect data consistency during the write by taking a non-blocking multiple-readers/single-writer lock on the translation cache 134. After installation in the translation cache 134, the translated code is accessible to all processor cores 122, but may not be executed. The translated code may be executed on each processor core 122 after local installation, as described above in connection with block 436 of FIG. 4.

After performing the installation, in block 528 the computing device 100 determines whether additional translations remain to be installed. If so, the method 500 loops back to block 518 to continue installation. If not, the method 500 completes block 516. After global installation is completed in block 516, the method 500 loops back to block 504 to determine whether additional translation cache operations are pending.

Examples

Illustrative examples of the devices, systems, and methods disclosed herein are provided below. An embodiment of the devices, systems, and methods may include any one or more, and any combination of, the examples described below.

Example 1 includes a computing device for multicore binary translation, the computing device comprising a global translation cache; a multi-core processor comprising a plurality of processor cores, the multi-core processor to execute a global thread and a local binary translation thread, the global thread to install binary translations in the global translation cache; and a binary translation module comprising a binary translation thread scheduler to determine, in a non-preemptive mode of a processor core of the plurality of processor cores and in response to entering the binary translation scheduler, whether the global thread is suspended; migrate the global thread to the processor core and resume the global thread in response to a determination that the global thread is suspended; determine, in the non-preemptive mode and in response to a determination that the global thread is not suspended, whether a global translation cache operation is pending; activate the global thread on the processor core in response to a determination that the global translation cache operation is pending; and start, in a preemptive mode on the processor core and in response to determining that the global translation cache operation is not pending, the local binary translation thread to generate a pending global translation cache operation; wherein the processor to enter, on a processor core of the plurality of processor cores, the binary translation scheduler in response to a hotspot event identifying a native code hotspot.

Example 2 includes the subject matter of Example 1, and wherein the local binary translation thread comprises a translation thread; the binary translation thread scheduler further to determine, in the non-preemptive mode in the binary translation scheduler, whether a binary translation exists for the hotspot in the global translation cache; and start, in the preemptive mode on the processor core and in response to a determination that the binary translation does not exist for the hotspot, the translation thread to: (i) generate the binary translation for the hotspot and (ii) enqueue the binary translation for installation when completed, wherein to enqueue the binary translation for installation comprises to generate the pending global translation cache operation; and wherein the global thread is further to determine, in the non-preemptive mode, whether the binary translation has been enqueued for installation; and install, in the preemptive mode, the binary translation into the global translation cache in response to a determination that the binary translation has been enqueued for installation.

Example 3 includes the subject matter of any of Examples 1 and 2, and wherein to determine whether the binary translation exists for the hotspot in the global translation cache comprises to take a non-blocking read lock on the global translation cache.

Example 4 includes the subject matter of any of Examples 1-3, and wherein to install the binary translation into the global translation cache comprises to take a non-blocking write lock on the global translation cache.

Example 5 includes the subject matter of any of Examples 1-4, and wherein the global thread is further to determine, in the preemptive mode, whether a global translation cache deletion event is pending prior to the determination whether the binary translation has been enqueued for installation; and schedule, in the non-preemptive mode, a local uninstall for each affected processor core of the multi-core processor in response to a determination that the global translation cache deletion event is pending; and the binary translation thread scheduler is further to determine, in the non-preemptive mode, whether a local uninstall is pending for the processor core prior to the determination whether the global thread is suspended; and perform, in the non-preemptive mode, the pending local uninstall in response to a determination that the local uninstall is pending.

Example 6 includes the subject matter of any of Examples 1-5, and wherein to schedule a local uninstall for each affected processor core in response to the determination that the global translation cache deletion event is pending comprises to take a non-blocking write lock on the global translation cache.

Example 7 includes the subject matter of any of Examples 1-6, and wherein the global thread is further to perform garbage collection, in the preemptive mode, to recover global translation cache memory; and schedule, in the non-preemptive mode, a local uninstall for each affected processor core of the multi-core processor in response to the garbage collection.

Example 8 includes the subject matter of any of Examples 1-7, and wherein to schedule a local uninstall for each affected processor core in response to the garbage collection comprises to take a non-blocking write lock on the global translation cache.

Example 9 includes the subject matter of any of Examples 1-8, and wherein the binary translation thread scheduler is further to determine, in the non-preemptive mode and prior to the determination whether the binary translation exists for the hotspot, whether the translation thread is suspended; resume, in the preemptive mode, the translation thread in response to a determination that the translation thread is suspended; determine, in the non-preemptive mode, whether the hotspot has been analyzed in response to a determination that the translation thread is not suspended; and start, in the preemptive mode, a hotspot analysis thread to identify a native code location for the hotspot in response to a determination that the hotspot has not been analyzed.

Example 10 includes the subject matter of any of Examples 1-9, and wherein the binary translation thread scheduler is further to install locally on the processor core, in the non-preemptive mode, the binary translation from the global translation cache in response to a determination that the binary translation exists for the hotspot.

Example 11 includes the subject matter of any of Examples 1-10, and wherein to install locally on the processor core further comprises to take a non-blocking read lock on the global translation cache.

Example 12 includes a computing device for partial binary translation, the computing device comprising a global translation cache; and a multi-core processor comprising a plurality of processor cores, the multi-core processor to execute native code in a native state of a processor core of the multi-core processor; transition from the native state to a non-preemptive translation nucleus state of the processor core in response to detection of a hotspot event generated by a profiler of the multi-core processor; transition from the translation nucleus state to a preemptive translation runtime state of the processor core in response to a starting of a local translation thread or a local analysis thread to generate translated code for installation; transition from the translation nucleus state to a preemptive global thread runtime state of the processor core in response to a starting of a global thread to install the generated translated code in the global translation cache; and transition from the global thread runtime state to a non-preemptive global thread nucleus state of the processor core in response to a writing of data into the global translation cache.

Example 13 includes the subject matter of Example 12, and wherein the multi-core processor is further to suspend the global thread in response to a detection of an interrupt while in the global thread runtime state; and transition from the translation nucleus state to the global thread runtime state in response to a resumption of the global thread.

Example 14 includes the subject matter of any of Examples 12 and 13, wherein to transition from the translation nucleus state to the global thread runtime state has higher priority than to transition from the translation nucleus state to the preemptive translation runtime state.

Example 15 includes the subject matter of any of Examples 12-14, and wherein to transition from the translation nucleus state to the global thread runtime state comprises to migrate the global thread to the processor core.

Example 16 includes the subject matter of any of Examples 12-15, and wherein the multi-core processor is further to suspend the local translation thread in response to a detection of an interrupt while in the translation runtime state; and transition from the translation nucleus state to the translation runtime state in response to a resumption of the local translation thread.

Example 17 includes the subject matter of any of Examples 12-16, and wherein to transition from the translation nucleus state to the translation runtime state in response to the resumption the local translation thread has higher priority than to transition from the translation nucleus state to the preemptive translation runtime state in response to the starting of the local translation thread or the local analysis thread.

Example 18 includes the subject matter of any of Examples 12-17, and wherein the multi-core processor is further to terminate the local analysis thread in response to the detection of an interrupt while in the translation runtime state.

Example 19 includes the subject matter of any of Examples 12-18, and wherein the multi-core processor is further to transition from the global thread nucleus state to the native state in response to a completion of installation of the translated code into the translation cache.

Example 20 includes the subject matter of any of Examples 12-19, and wherein the multi-core processor is further to transition from the translation nucleus state to the native state in response to a completion of local installation of the translated code.

Example 21 includes a method for multicore binary translation, the method comprising entering, on a processor core of a multi-core processor, a binary translation scheduler in response to a hotspot event identifying a native code hotspot; determining, in a non-preemptive mode in response to entering the binary translation scheduler, whether a global thread is suspended; migrating the global thread to the processor core and resuming the global thread in response to determining that the global thread is suspended; determining, in the non-preemptive mode and in response to determining that the global thread is not suspended, whether a global translation cache operation is pending; activating the global thread on the processor core in response to determining that the global translation cache operation is pending; and starting, in a preemptive mode on the processor core and in response to determining that the global translation cache operation is not pending, a local binary translation thread to generate a pending global translation cache operation.

Example 22 includes the subject matter of Example 21, and wherein starting the local translation thread comprises: determining, in the non-preemptive mode in the binary translation scheduler, whether a binary translation exists for the hotspot in a global translation cache; and starting, in a preemptive mode on the processor core and in response to determining that the binary translation does not exist for the hotspot, a translation thread to: (i) generate the binary translation for the hotspot and (ii) enqueue the binary translation for installation when completed, wherein enqueuing the binary translation for installation comprises generating the pending global translation cache operation; the method further comprising determining, in the non-preemptive mode and in the global thread, whether the binary translation has been enqueued for installation; and installing, in the preemptive mode and in the global thread, the binary translation into the global translation cache in response to determining that the binary translation has been enqueued for installation.

Example 23 includes the subject matter of any of Examples 21 and 22, wherein determining whether a binary translation exists for the hotspot in a global translation cache comprises taking a non-blocking read lock on the global translation cache.

Example 24 includes the subject matter of any of Examples 21-23, and wherein installing the binary translation into the global translation cache comprises taking a non-blocking write lock on the global translation cache.

Example 25 includes the subject matter of any of Examples 21-24, and further including determining, in the preemptive mode in the global thread, whether a global translation cache deletion event is pending prior to determining whether the binary translation has been enqueued for installation; scheduling, in the non-preemptive mode in the global thread, a local uninstall for each affected processor core of the multi-core processor in response to determining the global translation cache deletion event is pending; determining, in the non-preemptive mode in the binary translation scheduler, whether a local uninstall is pending for the processor core prior to determining whether the global thread is suspended; and performing, in the non-preemptive mode in the binary translation scheduler, the pending local uninstall in response to determining that the local uninstall is pending.

Example 26 includes the subject matter of any of Examples 21-25, and wherein scheduling a local uninstall for each affected processor core in response to determining the global translation cache deletion event is pending comprises taking a non-blocking write lock on the global translation cache.

Example 27 includes the subject matter of any of Examples 21-26, and wherein installing the binary translation into the global translation cache comprises: performing garbage collection, in the preemptive mode in the global thread, to recover global translation cache memory; and scheduling, in the non-preemptive mode in the global thread, a local uninstall for each affected processor core of the multi-core processor in response to performing the garbage collection.

Example 28 includes the subject matter of any of Examples 21-27, and wherein scheduling a local uninstall for each affected processor core of the multi-core processor in response to performing the garbage collection comprises taking a non-blocking write lock on the global translation cache.

Example 29 includes the subject matter of any of Examples 21-28, and wherein starting the local translation thread further comprises: determining, in the non-preemptive mode in the binary translation scheduler and prior to determining whether the binary translation exists for the hotspot, whether the translation thread is suspended; resuming, in the preemptive mode on the processor core, the translation thread in response to determining that the translation thread is suspended; determining, in the non-preemptive mode in the binary translation scheduler, whether the hotspot has been analyzed in response to determining that the translation thread is not suspended; and starting, in the preemptive mode on the processor core, a hotspot analysis thread to identify a native code location for the hotspot in response to determining that the hotspot has not been analyzed.

Example 30 includes the subject matter of any of Examples 21-29, and further including comprising installing locally on the processor core, in the non-preemptive mode in the binary translation scheduler, the binary translation from the global translation cache in response to determining that the binary translation exists for the hotspot.

Example 31 includes the subject matter of any of Examples 21-30, and wherein installing locally on the processor core further comprises taking a non-blocking read lock on the global translation cache.

Example 32 includes a method for partial binary translation on a multi-core processor, the method comprising executing native code in a native state of a processor core of the multi-core processor; transitioning from the native state to a non-preemptive translation nucleus state of the processor core in response to detecting a hotspot event generated by a profiler of the multi-core processor; transitioning from the translation nucleus state to a preemptive translation runtime state of the processor core in response to starting a local translation thread or a local analysis thread to generate translated code for installation; transitioning from the translation nucleus state to a preemptive global thread runtime state of the processor core in response to starting a global thread to install the generated translated code in a global translation cache; and transitioning from the global thread runtime state to a non-preemptive global thread nucleus state of the processor core in response to writing data into the global translation cache.

Example 33 includes the subject matter of Example 32, and further including suspending the global thread in response to detecting an interrupt while in the global thread runtime state; and transitioning from the translation nucleus state to the global thread runtime state in response to resuming the global thread.

Example 34 includes the subject matter of any of Examples 32 and 33, and wherein transitioning from the translation nucleus state to the global thread runtime state has higher priority than transitioning from the translation nucleus state to the preemptive translation runtime state.

Example 35 includes the subject matter of any of Examples 32-34, and wherein transitioning from the translation nucleus state to the global thread runtime state comprises migrating the global thread to the processor core.

Example 36 includes the subject matter of any of Examples 32-35, and further including suspending the local translation thread in response to detecting an interrupt while in the translation runtime state; and transitioning from the translation nucleus state to the translation runtime state in response to resuming the local translation thread.

Example 37 includes the subject matter of any of Examples 32-36, and wherein transitioning from the translation nucleus state to the translation runtime state in response to resuming the local translation thread has higher priority than transitioning from the translation nucleus state to the preemptive translation runtime state in response to starting the local translation thread or the local analysis thread.

Example 38 includes the subject matter of any of Examples 32-37, and further including terminating the local analysis thread in response to detecting an interrupt while in the translation runtime state.

Example 39 includes the subject matter of any of Examples 32-38, and further including transitioning from the global thread nucleus state to the native state in response to completing installation of the translated code into the translation cache.

Example 40 includes the subject matter of any of Examples 32-39, and further including transitioning from the translation nucleus state to the native state in response to completing local installation of the translated code.

Example 41 includes a computing device comprising a processor; and a memory having stored therein a plurality of instructions that when executed by the processor cause the computing device to perform the method of any of Examples 21-40.

Example 42 includes one or more machine-readable storage media comprising a plurality of instructions stored thereon that in response to being executed result in a computing device performing the method of any of Examples 21-40.

Example 43 includes a computing device comprising means for performing the method of any of Examples 21-40.

What is claimed is:

1. A computing device for multicore binary translation, the computing device comprising:
   a global translation cache;
   a multi-core processor comprising a plurality of processor cores, the multi-core processor to execute a global thread and a local binary translation thread, the global thread to install binary translations in the global translation cache; and
   a binary translation module comprising a binary translation thread scheduler to:
   determine, in a non-preemptive mode of a processor core of the plurality of processor cores and in response to entering the binary translation scheduler, whether the global thread is suspended;
   migrate the global thread to the processor core and resume the global thread in response to a determination that the global thread is suspended;
   determine, in the non-preemptive mode and in response to a determination that the global thread is not suspended, whether a global translation cache operation is pending;
   activate the global thread on the processor core in response to a determination that the global translation cache operation is pending; and
   start, in a preemptive mode on the processor core and in response to determining that the global translation cache operation is not pending, the local binary translation thread to generate a pending global translation cache operation;
   wherein the processor to enter, on a processor core of the plurality of processor cores, the binary translation scheduler in response to a hotspot event identifying a native code hotspot.

2. The computing device of claim 1, wherein:
   the local binary translation thread comprises a translation thread;
   the binary translation thread scheduler further to:
   determine, in the non-preemptive mode in the binary translation scheduler, whether a binary translation exists for the hotspot in the global translation cache; and
   start, in the preemptive mode on the processor core and in response to a determination that the binary translation does not exist for the hotspot, the translation thread to: (i) generate the binary translation for the hotspot and (ii) enqueue the binary translation for installation when completed, wherein to enqueue the binary translation for installation comprises to generate the pending global translation cache operation; and
   wherein the global thread is further to:
   determine, in the non-preemptive mode, whether the binary translation has been enqueued for installation; and
   install, in the preemptive mode, the binary translation into the global translation cache in response to a determination that the binary translation has been enqueued for installation.

3. The computing device of claim 2, wherein to determine whether the binary translation exists for the hotspot in the global translation cache comprises to take a non-blocking read lock on the global translation cache.

4. The computing device of claim 2, wherein to install the binary translation into the global translation cache comprises to take a non-blocking write lock on the global translation cache.

5. The computing device of claim 2, wherein:
   the global thread is further to:
   determine, in the preemptive mode, whether a global translation cache deletion event is pending prior to the determination whether the binary translation has been enqueued for installation; and
   schedule, in the non-preemptive mode, a local uninstall for each affected processor core of the multi-core processor in response to a determination that the global translation cache deletion event is pending; and
   the binary translation thread scheduler is further to:
   determine, in the non-preemptive mode, whether a local uninstall is pending for the processor core prior to the determination whether the global thread is suspended; and
   perform, in the non-preemptive mode, the pending local uninstall in response to a determination that the local uninstall is pending.

6. The computing device of claim 5, wherein to schedule a local uninstall for each affected processor core in response to the determination that the global translation cache deletion event is pending comprises to take a non-blocking write lock on the global translation cache.

7. The computing device of claim 5, wherein the global thread is further to:
perform garbage collection, in the preemptive mode, to recover global translation cache memory; and
schedule, in the non-preemptive mode, a local uninstall for each affected processor core of the multi-core processor in response to the garbage collection.

8. The computing device of claim 7, wherein to schedule a local uninstall for each affected processor core in response to the garbage collection comprises to take a non-blocking write lock on the global translation cache.

9. The computing device of claim 2, wherein the binary translation thread scheduler is further to:
determine, in the non-preemptive mode and prior to the determination whether the binary translation exists for the hotspot, whether the translation thread is suspended;
resume, in the preemptive mode, the translation thread in response to a determination that the translation thread is suspended;
determine, in the non-preemptive mode, whether the hotspot has been analyzed in response to a determination that the translation thread is not suspended; and
start, in the preemptive mode, a hotspot analysis thread to identify a native code location for the hotspot in response to a determination that the hotspot has not been analyzed.

10. The computing device of claim 2, wherein the binary translation thread scheduler is further to install locally on the processor core, in the non-preemptive mode, the binary translation from the global translation cache in response to a determination that the binary translation exists for the hotspot.

11. The computing device of claim 10, wherein to install locally on the processor core further comprises to take a non-blocking read lock on the global translation cache.

12. A computing device for partial binary translation, the computing device comprising:
a global translation cache; and
a multi-core processor comprising a plurality of processor cores, the multi-core processor to:
execute native code in a native state of a processor core of the multi-core processor;
transition from the native state to a non-preemptive translation nucleus state of the processor core in response to detection of a hotspot event generated by a profiler of the multi-core processor;
transition from the translation nucleus state to a preemptive translation runtime state of the processor core in response to a starting of a local translation thread or a local analysis thread to generate translated code for installation;
transition from the translation nucleus state to a preemptive global thread runtime state of the processor core in response to a starting of a global thread to install the generated translated code in the global translation cache; and
transition from the global thread runtime state to a non-preemptive global thread nucleus state of the processor core in response to a writing of data into the global translation cache.

13. The computing device of claim 12, wherein the multi-core processor is further to:
suspend the global thread in response to a detection of an interrupt while in the global thread runtime state; and
transition from the translation nucleus state to the global thread runtime state in response to a resumption of the global thread, wherein (i) to transition from the translation nucleus state to the global thread runtime state comprises to migrate the global thread to the processor core, and (ii) to transition from the translation nucleus state to the global thread runtime state has higher priority than to transition from the translation nucleus state to the preemptive translation runtime state.

14. The computing device of claim 12, wherein the multi-core processor is further to:
suspend the local translation thread in response to a detection of an interrupt while in the translation runtime state;
terminate the local analysis thread in response to the detection of an interrupt while in the translation runtime state; and
transition from the translation nucleus state to the translation runtime state in response to a resumption of the local translation thread, wherein to transition from the translation nucleus state to the translation runtime state in response to the resumption the local translation thread has higher priority than to transition from the translation nucleus state to the preemptive translation runtime state in response to the starting of the local translation thread or the local analysis thread.

15. The computing device of claim 12, wherein the multi-core processor is further to transition from the global thread nucleus state to the native state in response to a completion of installation of the translated code into the translation cache.

16. The computing device of claim 12, wherein the multi-core processor is further to transition from the translation nucleus state to the native state in response to a completion of local installation of the translated code.

17. One or more non-transitory, computer-readable storage media comprising a plurality of instructions that in response to being executed cause a computing device to:
enter, on a processor core of a multi-core processor of the computing device, a binary translation scheduler in response to a hotspot event identifying a native code hotspot;
determine, in a non-preemptive mode in response to entering the binary translation scheduler, whether a global thread is suspended;
migrate the global thread to the processor core and resume the global thread in response to determining that the global thread is suspended;
determine, in the non-preemptive mode and in response to determining that the global thread is not suspended, whether a global translation cache operation is pending;
activate the global thread on the processor core in response to determining that the global translation cache operation is pending; and
start, in a preemptive mode on the processor core and in response to determining that the global translation cache operation is not pending, a local binary translation thread to generate a pending global translation cache operation.

18. The one or more non-transitory, computer-readable storage media of claim 17, wherein:
to start the local binary translation thread comprises to:
determine, in the non-preemptive mode in the binary translation scheduler, whether a binary translation exists for the hotspot in a global translation cache; and
start, in a preemptive mode on the processor core and in response to determining that the binary translation does not exist for the hotspot, a translation thread to: (i) generate the binary translation for the hotspot and (ii)

enqueue the binary translation for installation when completed, wherein enqueuing the binary translation for installation comprises generating the pending global translation cache operation;

the one or more computer-readable storage media further comprising a plurality of instructions that in response to being executed cause the computing device to:

determine, in the non-preemptive mode and in the global thread, whether the binary translation has been enqueued for installation; and install, in the preemptive mode and in the global thread, the binary translation into the global translation cache in response to determining that the binary translation has been enqueued for installation.

19. The one or more non-transitory, computer-readable storage media of claim 18, further comprising a plurality of instructions that in response to being executed cause the computing device to:

determine, in the preemptive mode in the global thread, whether a global translation cache deletion event is pending prior to determining whether the binary translation has been enqueued for installation;

schedule, in the non-preemptive mode in the global thread, a local uninstall for each affected processor core of the multi-core processor in response to determining the global translation cache deletion event is pending;

determine, in the non-preemptive mode in the binary translation scheduler, whether a local uninstall is pending for the processor core prior to determining whether the global thread is suspended; and perform, in the non-preemptive mode in the binary translation scheduler, the pending local uninstall in response to determining that the local uninstall is pending.

20. The one or more non-transitory, computer-readable storage media of claim 19, wherein to install the binary translation into the global translation cache comprises to:

perform garbage collection, in the preemptive mode in the global thread, to recover global translation cache memory; and schedule, in the non-preemptive mode in the global thread, a local uninstall for each affected processor core of the multi-core processor in response to performing the garbage collection.

21. The one or more non-transitory, computer-readable storage media of claim 18, wherein to start the local translation thread further comprises to:

determine, in the non-preemptive mode in the binary translation scheduler and prior to determining whether the binary translation exists for the hotspot, whether the translation thread is suspended;

resume, in the preemptive mode on the processor core, the translation thread in response to determining that the translation thread is suspended;

determine, in the non-preemptive mode in the binary translation scheduler, whether the hotspot has been analyzed in response to determining that the translation thread is not suspended; and start, in the preemptive mode on the processor core, a hotspot analysis thread to identify a native code location for the hotspot in response to determining that the hotspot has not been analyzed.

22. The one or more non-transitory, computer-readable storage media of claim 18, further comprising a plurality of instructions that in response to being executed cause the computing device to install locally on the processor core, in the non-preemptive mode in the binary translation scheduler, the binary translation from the global translation cache in response to determining that the binary translation exists for the hotspot.

23. One or more non-transitory, computer-readable storage media comprising a plurality of instructions that in response to being executed cause a computing device to:

execute native code in a native state of a processor core of a multi-core processor of the computing device;

transition from the native state to a non-preemptive translation nucleus state of the processor core in response to detecting a hotspot event generated by a profiler of the multi-core processor;

transition from the translation nucleus state to a preemptive translation runtime state of the processor core in response to starting a local translation thread or a local analysis thread to generate translated code for installation;

transition from the translation nucleus state to a preemptive global thread runtime state of the processor core in response to starting a global thread to install the generated translated code in a global translation cache; and transition from the global thread runtime state to a non-preemptive global thread nucleus state of the processor core in response to writing data into the global translation cache.

24. The one or more non-transitory, computer-readable storage media of claim 23, further comprising a plurality of instructions that in response to being executed cause the computing device to:

suspend the global thread in response to detecting an interrupt while in the global thread runtime state; and transition from the translation nucleus state to the global thread runtime state in response to resuming the global thread, wherein (i) to transition from the translation nucleus state to the global thread runtime state comprises to migrate the global thread to the processor core, and (ii) to transition from the translation nucleus state to the global thread runtime state has higher priority than to transition from the translation nucleus state to the preemptive translation runtime state.

25. The one or more non-transitory, computer-readable storage media of claim 23, further comprising a plurality of instructions that in response to being executed cause the computing device to:

suspend the local translation thread in response to detecting an interrupt while in the translation runtime state;

terminate the local analysis thread in response to detecting an interrupt while in the translation runtime state; and transition from the translation nucleus state to the translation runtime state in response to resuming the local translation thread, wherein to transition from the translation nucleus state to the translation runtime state in response to resuming the local translation thread has higher priority than to transition from the translation nucleus state to the preemptive translation runtime state in response to starting the local translation thread or the local analysis thread.

26. A method for multicore binary translation, the method comprising:

entering, on a processor core of a multi-core processor of a computing device, a binary translation scheduler in response to a hotspot event identifying a native code hotspot;

determining, in a non-preemptive mode in response to entering the binary translation scheduler, whether a global thread is suspended;

migrating the global thread to the processor core and resume the global thread in response to determining that the global thread is suspended;

determining, in the non-preemptive mode and in response to determining that the global thread is not suspended, whether a global translation cache operation is pending;

activating the global thread on the processor core in response to determining that the global translation cache operation is pending; and starting, in a preemptive mode on the processor core and in response to determining that the global translation cache operation is not pending, a local binary translation thread to generate a pending global translation cache operation.

27. The method of claim 26, wherein:

starting the local binary translation thread comprises:
  determining, in the non-preemptive mode in the binary translation scheduler, whether a binary translation exists for the hotspot in a global translation cache; and
  starting, in a preemptive mode on the processor core and in response to determining that the binary translation does not exist for the hotspot, a translation thread to: (i) generate the binary translation for the hotspot and (ii) enqueue the binary translation for installation when completed, wherein enqueuing the binary translation for installation comprises generating the pending global translation cache operation;

and further comprising:
  determining, in the non-preemptive mode and in the global thread, whether the binary translation has been enqueued for installation; and
  installing, in the preemptive mode and in the global thread, the binary translation into the global translation cache in response to determining that the binary translation has been enqueued for installation.

28. The method of claim 27, further comprising:
determining, in the preemptive mode in the global thread, whether a global translation cache deletion event is pending prior to determining whether the binary translation has been enqueued for installation;

scheduling, in the non-preemptive mode in the global thread, a local uninstall for each affected processor core of the multi-core processor in response to determining the global translation cache deletion event is pending;

determining, in the non-preemptive mode in the binary translation scheduler, whether a local uninstall is pending for the processor core prior to determining whether the global thread is suspended; and performing, in the non-preemptive mode in the binary translation scheduler, the pending local uninstall in response to determining that the local uninstall is pending.

29. The method of claim 28, wherein installing the binary translation into the global translation cache comprises:
  performing garbage collection, in the preemptive mode in the global thread, to recover global translation cache memory; and
  scheduling, in the non-preemptive mode in the global thread, a local uninstall for each affected processor core of the multi-core processor in response to performing the garbage collection.

30. The method of claim 27, wherein starting the local translation thread further comprises:
  determining, in the non-preemptive mode in the binary translation scheduler and prior to determining whether the binary translation exists for the hotspot, whether the translation thread is suspended;

resuming, in the preemptive mode on the processor core, the translation thread in response to determining that the translation thread is suspended;

determining, in the non-preemptive mode in the binary translation scheduler, whether the hotspot has been analyzed in response to determining that the translation thread is not suspended; and starting, in the preemptive mode on the processor core, a hotspot analysis thread to identify a native code location for the hotspot in response to determining that the hotspot has not been analyzed.

31. The method of claim 27, further comprising installing locally on the processor core, in the non-preemptive mode in the binary translation scheduler, the binary translation from the global translation cache in response to determining that the binary translation exists for the hotspot.

32. A method for partial binary translation, the method comprising:
  executing native code in a native state of a processor core of a multi-core processor of a computing device;
  transitioning from the native state to a non-preemptive translation nucleus state of the processor core in response to detecting a hotspot event generated by a profiler of the multi- core processor;
  transitioning from the translation nucleus state to a preemptive translation runtime state of the processor core in response to starting a local translation thread or a local analysis thread to generate translated code for installation;
  transitioning from the translation nucleus state to a preemptive global thread runtime state of the processor core in response to starting a global thread to install the generated translated code in a global translation cache; and
  transitioning from the global thread runtime state to a non-preemptive global thread nucleus state of the processor core in response to writing data into the global translation cache.

33. The method of claim 32, further comprising:
suspending the global thread in response to detecting an interrupt while in the global thread runtime state; and
transitioning from the translation nucleus state to the global thread runtime state in response to resuming the global thread, wherein (i) transitioning from the translation nucleus state to the global thread runtime state comprises migrating the global thread to the processor core, and (ii) transitioning from the translation nucleus state to the global thread runtime state has higher priority than to transition from the translation nucleus state to the preemptive translation runtime state.

34. The method of claim 32, further comprising:
suspending the local translation thread in response to detecting an interrupt while in the translation runtime state;
terminating the local analysis thread in response to detecting an interrupt while in the translation runtime state; and
transitioning from the translation nucleus state to the translation runtime state in response to resuming the local translation thread, wherein transitioning from the translation nucleus state to the translation runtime state in response to resuming the local translation thread has higher priority than to transition from the translation nucleus state to the preemptive translation runtime state in response to starting the local translation thread or the local analysis thread.

* * * * *